United States Patent
Smith et al.

(10) Patent No.: US 10,704,504 B1
(45) Date of Patent: Jul. 7, 2020

(54) DECELERATION CYLINDER CUT-OFF (DCCO) METHODOLOGY WITH ENHANCED EGR

(71) Applicant: GM Global Technology Operations LLC, Detroit, MI (US)

(72) Inventors: Michael A. Smith, Clarkston, MI (US); Michael Kaczmar, Farmington Hills, MI (US); Robert Gallon, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/385,564

(22) Filed: Apr. 16, 2019

(51) Int. Cl.
*F02M 26/01* (2016.01)
*F02M 26/46* (2016.01)
*F02D 41/12* (2006.01)
*F02D 41/00* (2006.01)

(52) U.S. Cl.
CPC ......... *F02M 26/01* (2016.02); *F02D 41/0002* (2013.01); *F02D 41/0087* (2013.01); *F02D 41/12* (2013.01); *F02M 26/46* (2016.02); F02D 2041/0012 (2013.01)

(58) Field of Classification Search
CPC .... F02M 26/01; F02M 26/46; F02D 41/0002; F02D 41/12; F02D 41/0087; F02D 2041/0012
See application file for complete search history.

(56) References Cited

U.S. PATENT DOCUMENTS

| | | | |
|---|---|---|---|
| 10,167,799 B2 * | 1/2019 | Serrano | .................. F02D 41/12 |
| 2016/0146121 A1 | 5/2016 | Carlson | |

* cited by examiner

*Primary Examiner* — Xiao En Mo

(57) ABSTRACT

A method of operating an engine having an intake manifold, an exhaust manifold, a crankshaft, a plurality of working cylinders each having at least one intake valve and at least one exhaust valve, and an exhaust gas recirculation conduit providing fluid communication between the intake manifold and the exhaust manifold. The method includes: while the engine is operating, in response to a no engine torque request, deactivating a number of the working cylinders such that none of the deactivated working cylinders are fired and no air is pumped through the deactivated working cylinders as the crankshaft rotates, operating at least one of the plurality of working cylinders that is not deactivated to pump air through the non-deactivated working cylinder, and controlling gas flow through the exhaust gas recirculation conduit to circulate air pumped through the non-deactivated working cylinder to the intake manifold.

20 Claims, 2 Drawing Sheets

DECELERATION CYLINDER CUT-OFF (DCCO) METHODOLOGY WITH ENHANCED EGR

INTRODUCTION

The present disclosure relates to operation of an internal combustion engine, particularly operation of an engine employing deceleration cylinder cut-off (DCCO).

A major consideration in engine design and control is fuel efficiency. In order to reduce engine fuel consumption, several techniques have been proposed. In one of these techniques, known as deceleration fuel cut-off (DFCO), fuel injection to the cylinders is suspended when engine torque is not requested, such as when the vehicle is decelerating and the accelerator pedal is not depressed. While DFCO results in a reduction in fuel consumption, air is still pumped through the cylinders which results in pumping losses as well as potential issues related to large amounts of air being provided to exhaust aftertreatment devices such as a catalytic converter or a gasoline particulate filter. The issues related to pumping air through the cylinders can be mitigated using a technique known as deceleration cylinder cut-off (DCCO). In DCCO operation, in addition to suspending fuel injection, the intake and exhaust valves of the cylinder are controlled so that air is not pumped through the cylinder during zero torque operation.

While current DCCO systems achieve their intended purpose, there is a need for a new and improved system and method for DCCO.

SUMMARY

According to several aspects, a method of operating an engine is disclosed. The engine has an intake manifold, an exhaust manifold, a crankshaft, a plurality of working cylinders each having at least one intake valve and at least one exhaust valve, and an exhaust gas recirculation conduit providing fluid communication between the intake manifold and the exhaust manifold. The method includes, while the engine is operating and in response to a no engine torque request, deactivating a number of the working cylinders less than the entire plurality of working cylinders such that none of the deactivated working cylinders are fired and no air is pumped through the deactivated working cylinders as the crankshaft rotates. The method also includes operating at least one of the plurality of working cylinders that is not deactivated to pump air through the non-deactivated working cylinder. The method further includes controlling gas flow through the exhaust gas recirculation conduit to circulate air pumped through the non-deactivated working cylinder to the intake manifold.

In a further aspect of the disclosed method, the step of deactivating a number of the working cylinders includes controlling valve lift for the intake and exhaust valves associated with the deactivated cylinders to zero lift.

In another aspect of the disclosed method, the step of deactivating a number of the working cylinders includes controlling valve lift for the intake and exhaust valves associated with the deactivated cylinders using a sliding cam.

In another aspect of the disclosed method, the engine further includes a valve located in the exhaust gas recirculation conduit effective to modulate air flow to an exhaust aftertreatment device disposed between the exhaust manifold and a tailpipe.

In a further aspect of the disclosed method, the exhaust aftertreatment device is a catalytic converter.

In another aspect of the disclosed method, the exhaust aftertreatment device is a gasoline particulate filter.

In a further aspect of the disclosed method, the method further includes the steps of controlling the valve to provide a predetermined amount of air flow to the exhaust aftertreatment device, and performing a diagnostic procedure to measure a response of the exhaust aftertreatment device and/or a sensor exposed to the air flow.

In another aspect of the disclosed method, the sensor is an engine-out air-fuel sensor.

In an additional aspect of the disclosed method, the sensor is a switching $O_2$ sensor disposed downstream of a catalytic converter.

In another aspect of the disclosed method, the engine is a four-cylinder engine and the number of deactivated working cylinders is three.

According to several aspects, a system includes an engine having an intake manifold an exhaust manifold, a crankshaft, a plurality of working cylinders each having at least one intake valve and at least one exhaust valve. The engine also includes an exhaust gas recirculation conduit providing fluid communication between the intake manifold and the exhaust manifold. The system also includes a controller configured to, while the engine is operating and in response to a no engine torque request, deactivate a number of the working cylinders less than the entire plurality of working cylinders such that none of the deactivated working cylinders are fired and no air is pumped through the deactivated working cylinders as the crankshaft rotates. The controller is also configured to operate at least one of the plurality of working cylinders that is not deactivated to pump air through the non-deactivated working cylinder. The controller is also configured to control gas flow through the exhaust gas recirculation conduit to circulate air pumped through the non-deactivated working cylinder to the intake manifold.

In an additional aspect of the disclosed system, the controller is configured to deactivate a number of the working cylinders by controlling valve lift for the intake and exhaust valves associated with the deactivated cylinders to zero lift.

In another aspect of the disclosed system the controller is configured to deactivate a number of the working cylinders by controlling valve lift for the intake and exhaust valves associated with the deactivated cylinders by controlling an actuator configured to control the position of a sliding cam.

In a further aspect of the disclosed system, the engine further includes a valve located in the exhaust gas recirculation conduit effective to modulate air flow to an exhaust aftertreatment device disposed between the exhaust manifold and a tailpipe.

In another aspect of the disclosed system, the exhaust aftertreatment device is a catalytic converter.

In another aspect of the disclosed system, the exhaust aftertreatment device is a gasoline particulate filter.

In an additional aspect of the disclosed system, the controller is further configured to control the valve to provide a predetermined amount of air flow to the exhaust aftertreatment device, and perform a diagnostic procedure to measure a response of the exhaust aftertreatment device and/or a sensor exposed to the air flow.

In an additional aspect of the disclosed system, the sensor is an engine-out air-fuel sensor.

In another aspect of the disclosed system, the sensor is a switching $O_2$ sensor disposed downstream of a catalytic converter.

According to several aspects, a method of operating an engine is disclosed. The engine has an intake manifold, an exhaust manifold, a crankshaft, four working cylinders each having at least one intake valve and at least one exhaust valve, and an exhaust gas recirculation conduit providing fluid communication between the intake manifold and the exhaust manifold, the method comprising, while the engine is operating, in response to a no engine torque request, deactivating three of the working cylinders by controlling valve lift using a sliding cam for the intake and exhaust valves associated with the deactivated cylinders such that no air is pumped through the deactivated working cylinders as the crankshaft rotates. The method also includes operating the working cylinder that is not deactivated to pump air through the non-deactivated working cylinder. The method further includes controlling gas flow through the exhaust gas recirculation conduit to circulate air pumped through the non-deactivated working cylinder to the intake manifold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
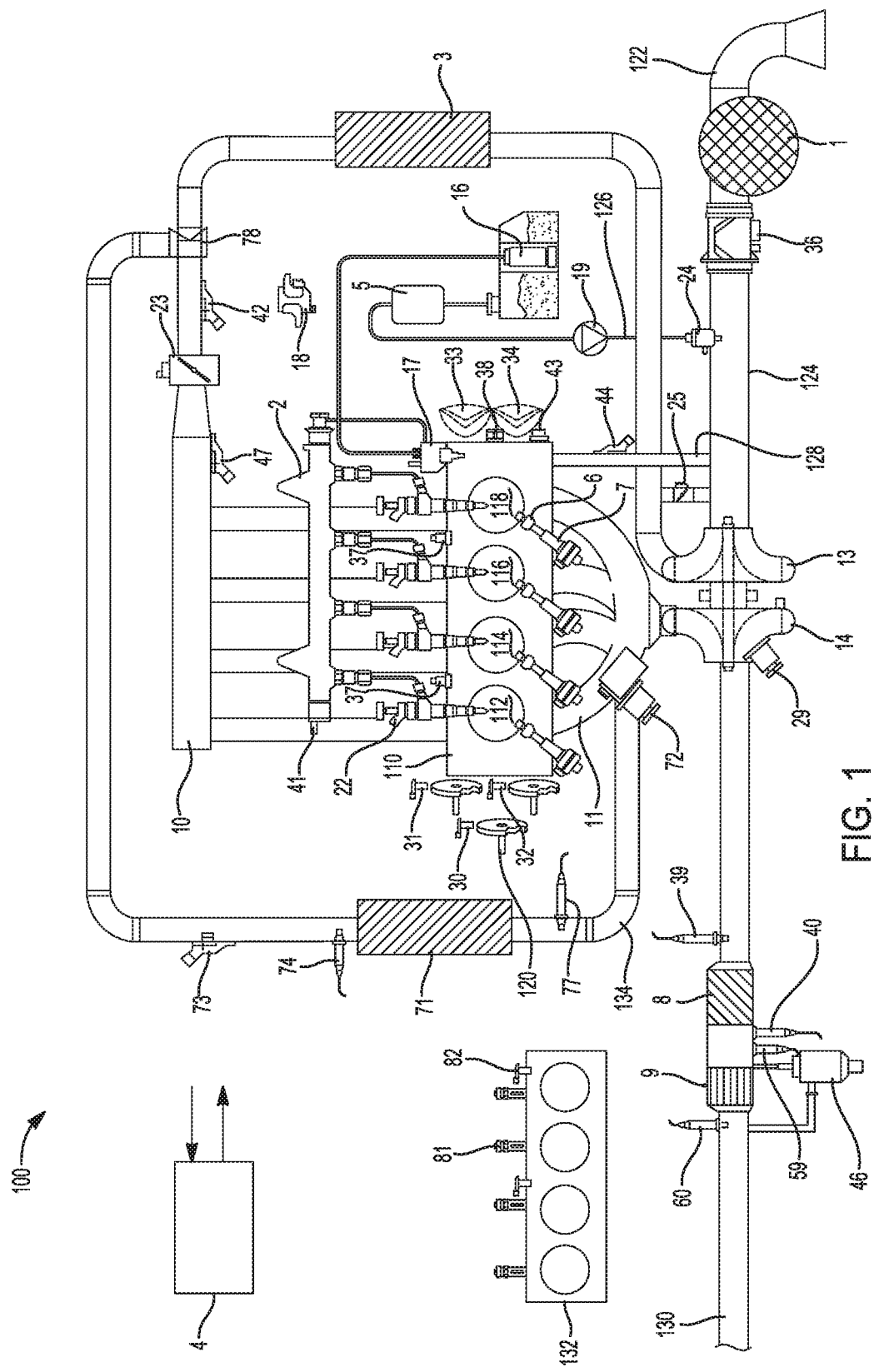
FIG. 1 is a depiction of an engine management system architecture according to an exemplary embodiment.

Referring to FIG. 1, an engine management system 100 includes an engine having an engine block 110, depicted in a non-limiting exemplary embodiment as a four-cylinder engine, the engine block 110 defining a first cylinder 112, a second cylinder 114, a third cylinder 116, and a fourth cylinder 118. Each cylinder cooperates with an associated piston and a cylinder head 132 to define a combustion chamber. As used herein, the term "working cylinder" refers to a combustion chamber defined in part by a cylinder defined by the engine block. The depiction in FIG. 1 is a generic engine management system that may include components that are not essential to the features claimed in the present disclosure. In the exemplary depiction, intake air enters a snorkel 122 and passes through an air filter 1 and a sensor 36. In various embodiments the sensor 36 may include a mass airflow sensor, an intake air temperature sensor, a relative humidity sensor, and/or a barometric pressure sensor. The intake air passes through an intake air duct 124 to the compressor stage 13 of a turbocharger, from which it passes through a charge air cooler 3. In an embodiment, the charge air cooler is a liquid to air heat exchanger including coolant connections (not shown). After leaving the charge air cooler 3, the air passes through a mixer 78 where it is mixed with exhaust gas recirculation (EGR) gas. A sensor 42 measures boost pressure and/or intake temperature. The air/EGR gas mixture passes through a throttle body 23 to an intake manifold 10 configured to supply air to the engine cylinders through engine intake valves (not shown). A sensor 47 measures intake manifold pressure.

With continued reference to FIG. 1, a feed pump 16 located in the fuel tank provides fuel to a cam driven fuel pump 17, which supplies high pressure fuel to a fuel rail 2. The fuel rail 2 supplies fuel to a plurality of fuel injectors 22, with one fuel injector 22 per engine cylinder, which are configured to inject fuel into each individual engine cylinder. An evaporative emission control canister 5 is in fluid communication with the fuel tank and with a purge pump 19. In an exemplary embodiment the purge pump 19 includes a pressure sensor (not shown). A purge conduit 126 provides fluid communication from the purge pump 19 to the intake air duct 124 through a purge solenoid 24. A PCV conduit 128 fluidly couples the engine block 110 to the intake air duct 124. A plurality of spark plugs 6 each having an ignition coil 7 is provided, with one spark plug per engine cylinder 112, 114, 116, 118, to ignite a fuel-air mixture in each cylinder. The burning fuel-air mixture in the cylinder urges a reciprocating piston (not shown) to turn a crankshaft, a portion of which is shown as 120. The combustion products from the burning fuel-air mixture are expelled through an exhaust valve (not shown) to an exhaust manifold 11. An EGR control valve 72 can be controlled to allow exhaust gas to be recirculated through an EGR conduit 134 to the mixer 78. The exemplary EGR conduit includes an EGR cooler 71. A wide-range air-fuel (WRAF) sensor 77 may be provided to measure the composition of the EGR gas stream. An EGR pressure sensor 73 and an EGR temperature sensor 74 may also be included.

With continued reference to FIG. 1, the exhaust manifold 11 provides exhaust gas to the turbine 14 of the turbocharger. In a non-limiting exemplary embodiment, the turbocharger is a variable-geometry turbocharger (VGT) having an associated vane position actuator 29 which may include a vane position sensor (not shown). Exhaust gas exiting the turbocharger is conveyed through an exhaust pipe to an exhaust aftertreatment device. The exhaust aftertreatment device may include a first portion 8 and a second portion 9. In an embodiment, the first portion 8 may comprise a first catalytic converter and the second portion 9 may comprise a second catalytic converter. In an alternative embodiment, the second portion 9 may comprise a gasoline particulate filter (GPF). In the embodiment shown in FIG. 1, an exhaust sensor 39 is provided to measure engine-out emissions. The exhaust sensor 39 may be a WRAF sensor. A switching $O_2$ sensor 40 is provided downstream of the first catalytic converter 8. A GPF inlet temperature sensor 59 and a GPF outlet temperature sensor 60 are provided, as well as a GPF delta pressure sensor 46. Exhaust gas leaving the exhaust aftertreatment device is discharged to atmosphere through a tailpipe 130.

The engine is equipped with a plurality of intake and exhaust valves. Each cylinder 112, 114, 116, 118 has at least one intake valve to control fluid communication between the intake manifold 10 and the associated cylinder. Each cylinder 112, 114, 116, 118 also has at least one exhaust valve to control fluid communication between the exhaust manifold 11 and the associated cylinder.

A cylinder head 132, shown for clarity removed from the engine block 110, is mounted to the engine block 110. The cylinder head 132 holds components effective to control operation of the intake and exhaust valves. Variable valve timing and/or variable valve lift systems can modify the operation of the intake and/or exhaust valves. An intake cam position sensor 31 and an exhaust cam position sensor 32 measure intake and exhaust cam position respectively. An intake cam phaser position sensor 33 and an exhaust cam phaser position sensor 34 measure intake and exhaust cam phaser position respectively. In an exemplary embodiment, a sliding cam is used to simultaneously alter valve lift of a plurality of engine intake valves and/or a plurality of engine exhaust valves. The sliding cam is actuated by sliding cam actuators 81. Position of the sliding cam is measured by sliding cam sensors 82.

The engine management system 100 includes a controller 4 configured to receive signals from sensors such as the position sensors, the temperature sensors, the pressure sensors, and the gas composition sensors included in the foregoing description. The controller 4 is also configured to provide control signals to actuators such as the fuel injectors 22, the throttle body 23, the purge solenoid 24, the compressor recirculation valve 25, and the vane position actuator 29 included in the foregoing description. The controller 4, can be a single device or a number of devices. Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The controller 4 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular time intervals during ongoing engine and vehicle operation. Alternatively, algorithms may be executed in response to occurrence of an event.

In order to reduce engine fuel consumption, a technique called deceleration cylinder cut-off (DCCO) has been proposed. In DCCO operation, at times when zero engine torque is requested fuel injection to the working cylinders is suspended, and the intake and exhaust valves of the cylinders are controlled so that air is not pumped through the cylinders. In conventional DCCO operation, all of the working cylinders of the engine are cut off, i.e. fuel is not injected and intake and exhaust valves remain closed during zero-torque operation. This requires providing actuators effective to selectively provide zero-lift valve profiles for each of the intake valves and exhaust valves in the engine.

The present disclosure describes a system and method in which fewer than the entire number of engine working cylinders are provided with actuating means to achieve zero-lift valve profiles. At least one of the working cylinders does not have its intake and exhaust valves deactivated such that the cylinder is allowed to pump air during times when zero torque is demanded. In the non-limiting exemplary embodiment of FIG. 1, the cylinders 114, 116, and 118 may be considered deactivated cylinders, i.e. cylinders whose intake and exhaust valves are deactivated during DCCO operation. Cylinder 112 may be considered non-deactivated, i.e. a cylinder whose intake and exhaust valves continue to open and close. The air pumped through this non-deactivated cylinder 112 is diverted from the exhaust manifold 11 through the EGR control valve 72 and the EGR conduit 134 to the intake manifold 10. From the intake manifold 10, the diverted air reenters the non-deactivated cylinder 112 to continue to be recirculated through the exhaust manifold 11, the EGR control valve 72, and the EGR conduit 134, and the intake manifold 10.

Under certain conditions it may be desirable to provide air flow through the exhaust aftertreatment device 8, 9 during times when zero engine torque is commanded. For example, a catalytic converter 8 or a GPF 9 may benefit from receiving air, for example to adjust an amount of oxygen stored in the aftertreatment device. Additionally or alternatively, it may be desirable to provide air to the engine-out exhaust sensor 39 and/or to the switching $O_2$ sensor 40 as part of a diagnostic procedure for the sensors 39, 40. A system according to aspects of the present disclosure can selectively provide air flow to the exhaust system and its associated sensors.

Figure 2:
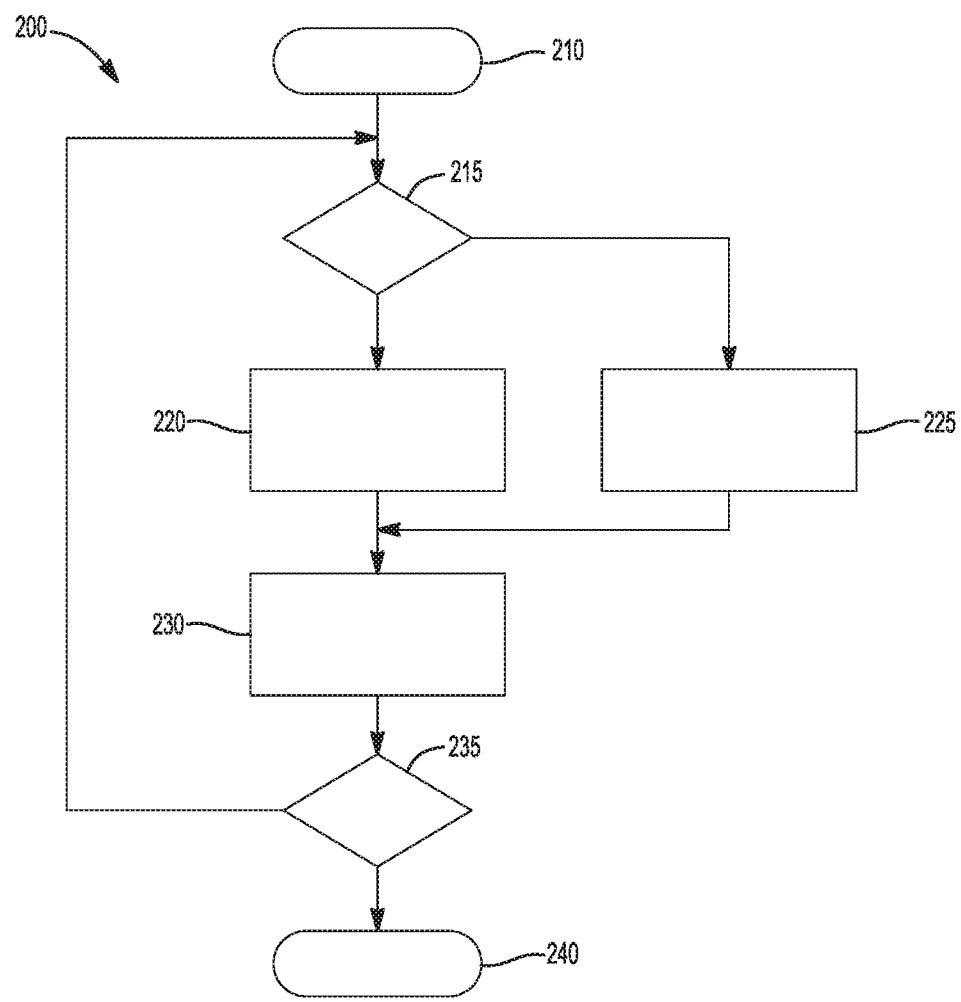
FIG. 2 is a flow chart of an DCCO control algorithm according to an exemplary embodiment.

Referring to FIG. 2, a flowchart is presented describing aspects of a DCCO method 200 according to the present disclosure. The method 200 is entered at step 210 when zero fueling is commanded. The method proceeds to a decision step 215, which evaluates whether or not oxygen is requested by the catalytic converter 8 or by the GPF 9. If it is determined in decision step 215 that oxygen is requested by the catalytic converter 8 or by the GPF 9, the method proceeds to step 220, where the EGR control valve 72 is actuated so as to allow air pumped by the non-deactivated cylinder 112 to flow to the exhaust aftertreatment device 8, 9. If it is determined in step 215 that oxygen is not requested by the catalytic converter 8 or by the GPF 9, the method proceeds to step 225, where the EGR control valve 72 is actuated so as to allow air pumped by the non-deactivated cylinder 112 to flow to the intake manifold 10.

With continued reference to FIG. 2, after the EGR control valve 72 is actuated in step 220 or step 225, the method proceeds to step 230. In step 230, the cylinders 114, 116, 118 are deactivated by controlling the intake and exhaust valves associated with the cylinders 114, 116, and 118 to a zero-lift profile. The method then proceeds to step 235, which determines if a fueling command has been received. If a fueling command has not been received, the method loops back to decision step 215. If step 235 determines that a fueling command has been received, the method exits the DCCO mode by way of step 240.

In an aspect of the present disclosure, the engine may use a sliding cam valve lift system (SCS) to control valve lift on the deactivated cylinders 114, 116, 118. A sliding cam valve lift system enables the controller 4 to change the camshaft lift profile of the intake and exhaust camshafts while the engine is running. The SCS includes a camshaft lift profile sleeve that can be moved axially on the camshaft to select one of a plurality of camshaft lift profiles. Control of the axial position of the sleeve is achieved by a sliding cam actuator. The SCS has intake camshaft profile actuators and exhaust camshaft profile actuators that vary the camshaft lift profile sleeve position axially on the camshaft in response to commands from the controller 4. In an aspect of the present disclosure, a first camshaft lift profile sleeve can be used to select between a nominal lift profile and a zero-lift profile for all of the intake valves associated with all three of the deactivated cylinders 114, 116, 118, and a second camshaft lift profile sleeve can be used to select between a nominal lift profile and a zero-lift profile for all of the exhaust valves associated with all three of the deactivated cylinders 114, 116, 118. Having each camshaft lift profile sleeve control valve lift for the valves associated with three cylinders 114, 116, 118 enables switching between normal operation and DCCO operation of the engine with a reduced number of cam lift actuators.

A DCCO system and method of the present disclosure offers several advantages. These include the ability to provide a controllable amount of air to the exhaust aftertreatment system to enable oxygen replenishment for a catalytic converter or a gasoline particulate filter. Another advantage is to provide a controllable amount of air to the exhaust aftertreatment system and sensors to facilitate component diagnostics. A further advantage is reduced hardware cost and complexity by using a sliding cam to control valve lift for three cylinders of a four-cylinder engine.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of operating an engine having an intake manifold, an exhaust manifold, a crankshaft, a plurality of working cylinders each having at least one intake valve and at least one exhaust valve, and an exhaust gas recirculation conduit providing fluid communication between the intake manifold and the exhaust manifold, the method comprising:
    while the engine is operating, in response to a no engine torque request:
    deactivating a number of the working cylinders less than the entire plurality of working cylinders such that none of the deactivated working cylinders are fired and no air is pumped through the deactivated working cylinders as the crankshaft rotates; and
    operating at least one of the plurality of working cylinders that is not deactivated to pump air through the non-deactivated working cylinder; and
    controlling the flow of air pumped through the non-deactivated working cylinder to selectively flow to the intake manifold or to an exhaust aftertreatment device disposed between the exhaust manifold and a tailpipe.

2. The method of claim 1, wherein the step of deactivating a number of the working cylinders comprises controlling valve lift for the intake valves and exhaust valves associated with the deactivated cylinders to zero lift.

3. The method of claim 1, wherein the step of deactivating a number of the working cylinders includes controlling valve lift for the intake valves and exhaust valves associated with the deactivated cylinders using a sliding cam.

4. The method of claim 1, wherein the exhaust aftertreatment device is a catalytic converter.

5. The method of claim 1, wherein the exhaust aftertreatment device is a gasoline particulate filter.

6. The method of claim 1, wherein the step of controlling the flow of air pumped through the non-deactivated working cylinder comprises controlling a valve located in the exhaust gas recirculation conduit.

7. The method of claim 6, further including the steps of:
    controlling the valve to provide a predetermined amount of air flow to the exhaust aftertreatment device; and
    performing a diagnostic procedure to measure a response of the exhaust aftertreatment device and/or a sensor exposed to the air flow.

8. The method of claim 7, wherein the sensor is an engine-out air-fuel sensor.

9. The method of claim 7, wherein the sensor is a switching $O_2$ sensor disposed downstream of a catalytic converter.

10. The method of claim 1, wherein the engine is a four-cylinder engine and wherein the number of deactivated working cylinders is three.

11. A system comprising:
    an engine having an intake manifold an exhaust manifold, a crankshaft, a plurality of working cylinders each having at least one intake valve and at least one exhaust valve, and an exhaust gas recirculation conduit providing fluid communication between the intake manifold and the exhaust manifold; and
    a controller configured to:
        while the engine is operating, in response to a no engine torque request:
        deactivate a number of the working cylinders less than the entire plurality of working cylinders such that none of the deactivated working cylinders are fired and no air is pumped through the deactivated working cylinders as the crankshaft rotates; and
        operate at least one of the plurality of working cylinders that is not deactivated to pump air through the non-deactivated working cylinder; and
        control the flow of air pumped through the non-deactivated working cylinder to selectively flow to the intake manifold or to an exhaust aftertreatment device disposed between the exhaust manifold and a tailpipe.

12. The system of claim 11, wherein the controller is configured to deactivate a number of the working cylinders by controlling valve lift for the intake valves and exhaust valves associated with the deactivated cylinders to zero lift.

13. The system of claim 11, wherein the controller is configured to deactivate a number of the working cylinders by controlling valve lift for the intake valves and exhaust valves associated with the deactivated cylinders by controlling an actuator configured to control the position of a sliding cam.

14. The system of claim 11, wherein the exhaust aftertreatment device is a catalytic converter.

15. The system of claim 11, wherein the exhaust aftertreatment device is a gasoline particulate filter.

16. The system of claim 11, wherein the controller is configured to control the flow of air pumped through the non-deactivated working cylinder by controlling a valve located in the exhaust gas recirculation conduit.

17. The system of claim 16, wherein the controller is further configured to:
    control the valve to provide a predetermined amount of air flow to the exhaust aftertreatment device; and
    perform a diagnostic procedure to measure a response of the exhaust aftertreatment device and/or a sensor exposed to the air flow.

18. The system of claim 17, wherein the sensor is an engine-out air-fuel sensor.

19. The system of claim 17, wherein the sensor is a switching $O_2$ sensor disposed downstream of a catalytic converter.

20. A method of operating an engine having an intake manifold, an exhaust manifold, a crankshaft, four working cylinders each having at least one intake valve and at least one exhaust valve, and an exhaust gas recirculation conduit providing fluid communication between the intake manifold and the exhaust manifold, the method comprising:
    while the engine is operating, in response to a no engine torque request:
    deactivating three of the working cylinders by controlling valve lift using a sliding cam for the intake and exhaust valves associated with the deactivated cylinders such that no air is pumped through the deactivated working cylinders as the crankshaft rotates;

operating the working cylinder that is not deactivated to pump air through the non-deactivated working cylinder; and controlling gas flow through the exhaust gas recirculation conduit to circulate air pumped through the non-deactivated working cylinder to the intake manifold.

* * * * *